UNITED STATES PATENT OFFICE.

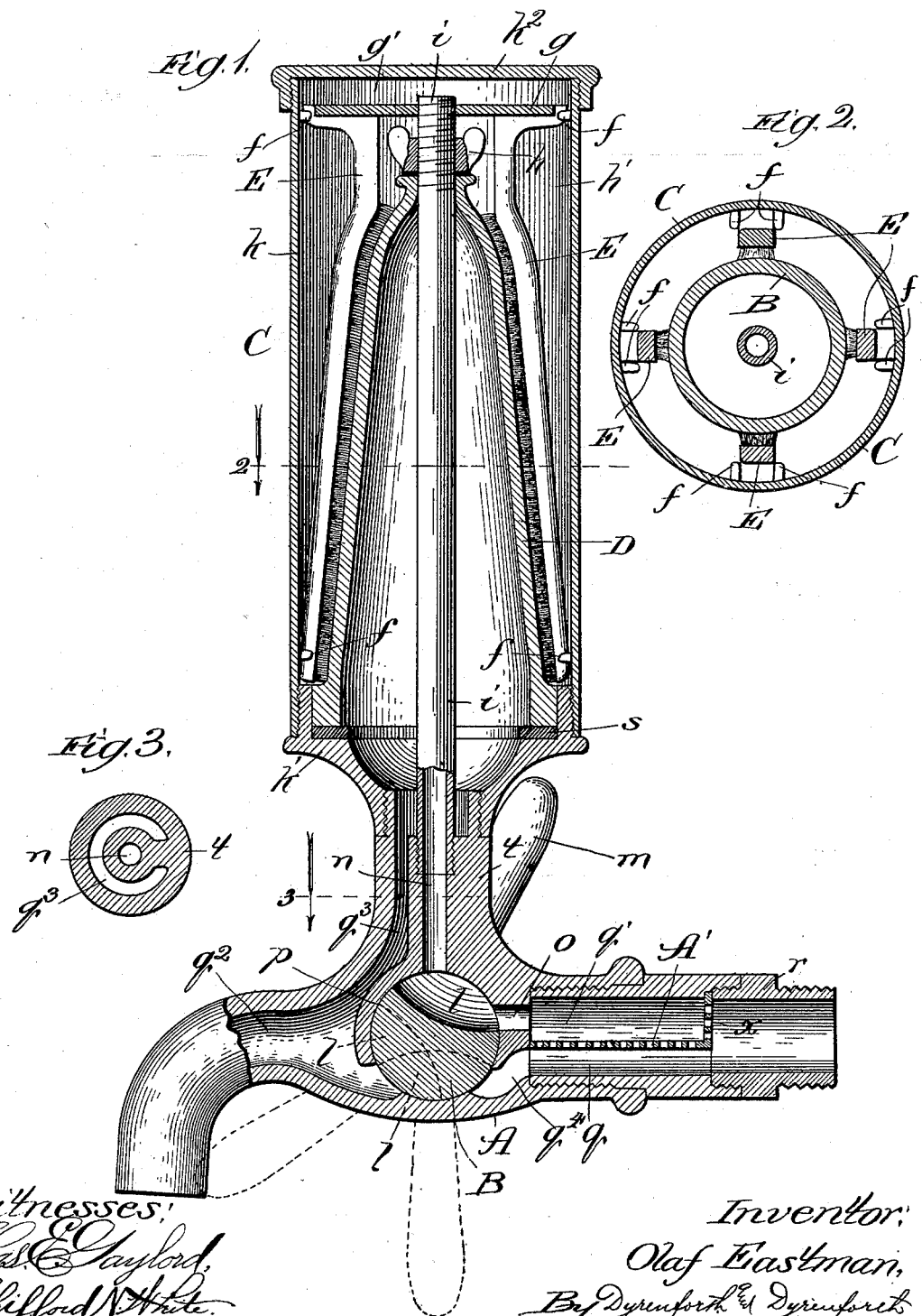

OLAF EASTMAN, OF CHICAGO, ILLINOIS.

WATER-FILTER.

SPECIFICATION forming part of Letters Patent No. 509,596, dated November 28, 1893.

Application filed February 16, 1893. Serial No. 462,612. (No model.)

*To all whom it may concern:*

Be it known that I, OLAF EASTMAN, a citizen of the United States, residing at Chicago, in the county of Cook and State of Illinois, have invented a new and useful Improvement in Water-Filters, of which the following is a specification.

My invention relates to certain new and useful improvements in the class of water-filters to which belongs the filter set forth in Letters Patent of the United States No. 478,157, granted to me on the 5th day of July, 1892. In other words my invention relates to improvements in a construction of water-filter adapting it to be secured to a water-supply pipe to permit of the water being drawn through it, at will, in either a filtered condition or in an unfiltered condition (as for washing purposes), and to afford a double filtering operation, the primary filtration serving to extract from the water, on its way to the discharge from the faucet, the heavier or coarser impurities, and the secondary filtration serving to intercept the remaining impurities. According to my aforesaid patented construction, the faucet, which is surmounted by a filtering chamber, is divided longitudinally of its inlet-portion, into an upper and lower chamber by a perforated diaphragm or strainer, the lower chamber leading directly to the discharge-end of the faucet, communication with which is controlled by a rotary valve; and the upper chamber communicating through a valve-controlled passage with the upper end of the filtering-chamber, through the filtering material in which the admitted water percolates downward and discharges freely from the faucet. The two valves are geared together in a manner to be operated for setting them simultaneously, by turning a handle on one, to close both passages from the inlet-chambers; to close the passage leading from the lower inlet-chamber and open that leading from the upper inlet-chamber; and to close the passage leading from the upper inlet-chamber and open that leading from the lower inlet-chamber.

One of the objects of my present improvement is materially to simplify the faucet-construction, for use with the particular construction of filter-chamber in my aforesaid patent or with other construction thereof (such as is hereinafter described), the simplification consisting, broadly stated, in providing a single valve having a single port to serve the purpose of the two valves, by being adjustable to open or close, at will, either inlet, and to close both at once.

Another object of my invention is to provide a construction of the filter-chamber, or filter proper, for use with the faucet-construction of my aforesaid patent, or with that of my present improvement referred to, or with any other similarly operating faucet, whereby the filter may, without removing it from, or materially disturbing it in, its operative position, be readily and thoroughly cleansed by washing.

In the accompanying drawings, Figure 1 is a vertical sectional view of my improved filter shown as secured to an ordinary supply-pipe, and showing, by way of diagram, the three different positions of the valve. Fig. 2 is a section taken at the line 2 on Fig. 1 and viewed in the direction of the arrow; and Fig. 3 is a section taken at the line 3 on Fig. 1 and viewed in the direction of the arrow.

A is the faucet, provided in its inlet-end at which it is screwed upon an ordinary supply-pipe, as indicated at $r$, with a longitudinal perforated diaphragm or strainer $A'$, preferably turned up, as shown at $x$, at its rear end. The strainer $A'$ thus affords the two intercommunicating water-inlet chambers $q$ and $q'$.

Within the faucet and extending upward therefrom between its ends, is the solid portion or wall $t$, in which are formed the circular valve-seat $p$, a passage $o$ leading thereto from the inlet-chamber $q'$ and a vertical passage $n$ terminating at its lower end in the valve-seat.

B is a valve, which may be of the ordinary rotary plug variety, fitting in the seat $p$ and provided with a handle $m$ for setting it, the periphery of the plug being provided with a recess $l$, forming a port whereby, when the valve is set to the position indicated by the full lines in Fig. 1, the recess $l$ affords communication between the passages $o$ and $n$; whereby when the valve is set, as indicated by the horizontal dotted line 1, communication is afforded between the chamber $q$ and the discharge $q^2$ from the faucet; and whereby, when the valve is set to the position indicated by the vertical dotted line 1, both passages $n$ and $q^2$ are closed to the supply.

C is the filter surmounting the faucet, and which may be fastened thereon by screwing, as indicated. It involves a cylindrical chamber $k$, adjustably fastened at its lower end, as by screwing, to a base $k'$ secured on the faucet, and having at its upper end a cover $k^2$, which should also be screwed in place; a hollow filtering block D, preferably of the somewhat conical form illustrated and formed of porous stone, baked clay, or the like, fits inside the chamber $k$, and rests on the base $k'$, where it should be packed as by the gasket $s$ illustrated. A tube $i$ extends upward from the passage $n$, with which it communicates and at which it is fastened, through the filtering-block D, being threaded at its upper end to permit the application of a clamp-nut $h$ against a packing-ring $h'$ to bear against the upper end of the block and thus hold it against its seat. A diaphragm $g$ is supported in the upper end of the chamber C some distance below the cover $k^2$ to afford a chamber $g'$, into which the tube $i$ enters through the diaphragm, which is thus centered on the tube, the diameter of which diaphragm is less than that of the interior of the cylinder $k$, so that the water entering the chamber $g'$ may freely flow over its edges. From the diaphragm $g$ depend brushes E, preferably four in number, at equal intervals apart and rigidly fastened to the diaphragm, the form of the brushes being such as to cause them to conform to the exterior contour of the block D along which they extend, each between pairs of lugs or stops $f$ provided in proper positions near the upper and lower ends of the chamber $k$, from the wall of which they project inward.

Following is a description of the operation of the faucet portion of my improved filter, whether applied to the construction of the filter portion set forth in my aforesaid patent, or to that hereinbefore described in detail. On turning the valve B to the position which is illustrated by the full line representation Fig. 1, water from the supply $r$ enters the chamber $q$ and filters through the diaphragm A' into the chamber $q'$, leaving behind the coarser impure matter it carries. From the chamber $q'$ the water enters, through the passages $o$, $l$ and $n$ and tube $i$, the chamber $g'$, whence it runs into the filtering-chamber $k$, percolates through the filtering material therein and discharges by way of the passage $q^3$ at the outlet $q^2$, thoroughly filtered. If it be desired to draw water without filtering it, the valve B is turned to bring its port $l$ to the position in which it is represented by the horizontal dotted line 1 in Fig. 1, wherein it closes communication between the passages $o$ and $n$, and opens communication of a passage $q^4$ leading from the chamber $q$ with the outlet $q^2$. To shut off the flow of water from the supply $r$, the valve B is turned to bring its port $l$ into the position indicated by the vertical dotted line 1 in Fig. 1.

By the construction of the filtering portion of my device hereinbefore described in detail, it may be readily cleansed without requiring it to be separated, for the purpose, from its operative position and without difficulty, by turning the cylinder C at its screw-connection with the base $k'$, to loosen it, when by oscillating it back and forth a few times, the brushes E will scour the outer surface of the hollow block D (water being meantime admitted to the chamber $g'$ by properly turning the valve for the purpose) thereby removing all slime and impurities, from the filtering-block, which are taken up by the water and escape with the latter between the threads at the loosened lower end of the connection of the cylinder $k$ with the base $k'$.

What I claim as new, and desire to secure by Letters Patent, is—

1. In combination, a faucet having its inlet-portion divided by a strainer into chambers $q$ and $q'$, and having outlet-passages $o$ and $q^4$ leading from the said chambers, a discharge-outlet $q^2$ and an upward extending passage $n$, a valve adjustably supported in the faucet and adapted to produce, at will, communication between the passages $o$ and $n$, or the passage $q^4$ and outlet $q^2$, or to shut off the supply, and a filter secured on the faucet and communicating with the passage $n$ and outlet $q^2$, substantially as described.

2. In combination, a faucet A having its inlet portion divided by a strainer A' into chambers $q$ and $q'$ and having outlet passages $o$ and $q^4$ leading from the said chambers, a discharge outlet $q^2$ and an upward extending passage $n$, a rotary valve B, having a peripheral recess $l$, supported in the faucet and adjustable to produce, at will, communication through the recess $l$ between the passages $o$ and $n$, or the passage $q^4$ and outlet $q^2$, or to close the passages $o$ and $q^4$, and a filter, secured on the faucet, communicating with the passage $n$ and outlet $q^2$, substantially as described.

3. In combination, a filter formed with a chamber containing a stationary filtering-block and supported to permit oscillation on its base, and a brush supported in the said chamber to oscillate therewith against the outer surface of the filtering-block, and a faucet on which the filter is supported and with which it communicates and containing valve-mechanism operative, at will, to direct the water-supply through the filter to the faucet discharge, or directly to the said discharge, substantially as described.

4. In combination, a filter comprising a base $k'$, a chamber $k$ having a cover $k^2$ and interior stops $f$ and secured on the base, a porous filtering-block D secured stationarily against the base in the chamber, a tube $i$ passing through the filtering-block and on which said block is clamped down, a diaphragm $g$ forming a chamber $g'$ in the chamber $k$ and carrying brushes E, and a faucet A, on which the said filter is secured, adapted to be connected with a water-supply pipe $r$, and containing a strainer dividing the inlet-portion of the faucet into chambers $q$ and $q'$ having outlets $o$ and $q^4$, a passage $n$ with which the filter-tube $i$ is connected, a passage $q^3$ affording communication between the filter and discharge outlet $q^2$ of the faucet, and a valve B mounted in the water-passages in the faucet and operative to force the water through the filter to the faucet discharge, or directly through the faucet, substantially as described.

OLAF EASTMAN.

In presence of—
  J. N. HANSON,
  M. J. FROST.